United States Patent
Ahn

(10) Patent No.: US 7,869,342 B2
(45) Date of Patent: Jan. 11, 2011

(54) TRANSMITTING APPARATUS, RECEIVING APPARATUS, TRANSMITTING METHOD, RECEIVING METHOD, INFORMATION RECORDING MEDIUM AND PROGRAM

(75) Inventor: Chang-Jun Ahn, Tokyo (JP)

(73) Assignee: National Institute of Information and Communications Technology, Tokyo ( * ) Notice: Subject to any disclaimer, the term of this patent is extended or adjusted under 35 U.S.C. 154(b) by 155 days.

(21) Appl. No.: 12/088,549

(22) PCT Filed: Sep. 30, 2005

(86) PCT No.: PCT/JP2005/018095

§ 371 (c)(1),
(2), (4) Date: Mar. 28, 2008

(87) PCT Pub. No.: WO2007/043097

PCT Pub. Date: Apr. 19, 2007

(65) Prior Publication Data

US 2009/0040917 A1  Feb. 12, 2009

(51) Int. Cl.
*H04J 11/00* (2006.01)
(52) U.S. Cl. .................................. 370/208; 375/260
(58) Field of Classification Search ................ 370/203, 370/208–210; 375/260
See application file for complete search history.

(56) References Cited

U.S. PATENT DOCUMENTS 7,215,656 B1  5/2007  Kim et al.

2007/0060062 A1  3/2007  Wengerter

FOREIGN PATENT DOCUMENTS

| JP | H11-154928 A1 | 6/1999 |
|---|---|---|
| JP | 2001-238269 | 8/2001 |
| JP | 2002-246958 | 8/2002 |
| JP | 2003-152681 A1 | 5/2003 |

(Continued)

OTHER PUBLICATIONS

Toshiyuki Nakanishi et al., "Variable Coding Rate OFDM Transmission on One-Cell Reuse TDMA Systems", Mar. 2004, pp. 113 to 118, The Institute of Electronics, Information and Communication Engineers.

(Continued)

*Primary Examiner*—Ricky Ngo
*Assistant Examiner*—Pao Sinkantarakorn
(74) *Attorney, Agent, or Firm*—Howard & Howard Attorneys PLLC

(57) ABSTRACT

In a transmission device 101, a modulation portion 102 carries out modulation of encoded data based on an adaptive modulation command based on feedback information sent from the receiving side, a frequency symbol diffusion block 105 multiplies the plurality of signals outputted by a serial-parallel conversion portion 104 by an orthogonal diffusion code and combines them, a pseudo random-number multiplication portion 106 multiplies each of them by a pseudo random number, an inverse Fourier transform portion 107 conducts inverse Fourier transform, a parallel-serial conversion portion 108 conducts parallel-serial conversion, a guard interval addition portion 109 adds a guard interval and a transmission portion 110 transmits a signal so that only one feedback information and modulation level information is required for each frequency symbol diffusion block 105 and transmission rate can be improved.

10 Claims, 12 Drawing Sheets

FOREIGN PATENT DOCUMENTS

| | | |
|---|---|---|
| JP | 2004-187257 | 7/2004 |
| JP | 2004-200856 A1 | 7/2004 |
| JP | 2004-253894 A1 | 9/2004 |
| JP | 3603187 B2 | 12/2004 |
| JP | 2007-512730 | 5/2007 |
| WO | 03/021829 A1 | 3/2003 |

OTHER PUBLICATIONS

Chang-Jun Ahn et al., "The Effects of Modulation Combination, Target BER, Doppler Frequency, and Adaptation Interval on the Performance of Adaptive OFDM in Broadband Mobile Channel", Sep. 24, 2001, pp. 167 to 174, copyright 2002 IEEE.

Chang-Jun Ahn et al., "Differential Modulated Pilot Symbol Assisted Adaptive OFDM for reducing the MLI", Nov. 2, 2004, pp. 577 to 580, copyright 2004 IEEE.

Chang-Jun Ahn et al., Differential Modulated Pilot Symbol Assisted Adaptive OFDM for Reducing the MLI with Predicted FBI, pp. 436-442, vol. E88-B, No. 2, copyright Feb. 2005 The Institute of Electronics, Information and Communication Engineers.

Hikaru Ishikawa et al., "A Stady on Adaptive Modulation in OFDM using Data Spread and Power Control", p. 258, copyright 2005.

Tsutomo Ohno, MC-CDMA System Using Unitary Space-Time Modulation on Down-link Broadband Mobile Radio Communication, IEICE Technical Report, vol. 103, No. 12, Japan, Year: 2003.

Shogo Fukudo, JP Office Action, Aug. 23, 2010.

Shogo Fukudo, JP Office Action, Aug. 23, 2010 (English Translation).

(a) CONVENTIONAL AMS/OFDM (b) AMS/OFDM OF THIS EMBODIMENT

TRANSMITTING APPARATUS, RECEIVING APPARATUS, TRANSMITTING METHOD, RECEIVING METHOD, INFORMATION RECORDING MEDIUM AND PROGRAM

TECHNICAL FIELD

The present invention relates to a transmission device, receiving device, transmission method, receiving method, computer-readable information recording medium that records a program realizing them using a computer, and the program suitable for improvement of performance of adaptive OFDM (Adaptive Orthogonal Frequency Division Multiplexing) communication.

BACKGROUND ART

A demand for high data rate and high-quality multimedia service has been raised in the radio communication field recently. In the mobile wireless environment, signals are usually deteriorated by fading or multipath delay phenomenon.

In such a communication channel, an influence of fading on amplitude of a signal might become serious or an influence of inter-symbol interference (ISI; Inter-Symbol Interference) might become serious by frequency selectivity of the channel, which lowers error performance and might disable communication depending on the case.

On the other hand, the OFDM technology is an effective method to reduce these influences of a multipath channel. That is because the ISI can be erased by inserting a guard interval longer than a delay spread of the channel.

Thus, the OFDM is employed in various next-generation wide-area WLAN (Wireless Local Area Network) of IEEE 802.11a, IEEE 802.11g, European HIPERLAN/2 and the like.

Ground digital audio broadcasting (DAB; Digital Audio Broadcasting) and digital video broadcasting are also proposed for the wide-area radio multiple access system. They are IEEE 802.16 wireless MAN standard and interactive DVB-T, for example.

Many of the OFDM systems use a fixed modulation scheme for all the carriers; this is for simplification.

However, there is a possibility that performance is improved by using a different demodulation scheme according to a channel state for each sub carrier of the OFDM system.

In this case, coherent or differential phase- or amplitude modulation scheme may be used. It includes BPSK, QPSK, 8PSK, 16QAM, 64QAM and the like, for example.

Each modulation scheme has a tradeoff between spectral efficiency and bit error rate (BER).

Thus, the best modulation scheme is such that the bit error rate is an allowable degree and the spectral efficiency can be maximized.

Such adaptive modulation schemes are disclosed in the documents mentioned below:

Non-Patent Literature 1: C. Ahn and I. Sasase, The effects of modulation combination, target BER, Doppler frequency, and adaptive interval on the performance of adaptive OFDM in broadband mobile channel, IEEE Trans. Consumer Electronics, vol. 48, no. 1, pp. 167-174, February, 2002

Non-Patent Literature 2: T. Nakanishi, S. Sampei and N. Morinaga, Variable coding rate OFDM transmission on one-cell reuse TDMA systems, IEICE Trans. Communications, vol. EB-88, no. 2, pp. 535-540, February, 2005

Non-Patent Literature 3: C. Ahn, S. Takahashi and H. Harada, Differential Modulated Pilot Symbol Assisted Adaptive OFDM for Reducing the MLI with Predicted FBI, IEICE Trans. Communications, vol. EB-88, no. 2, pp. 436-442, February, 2005

Non-Patent Literature 4: C. Ahn, S. Takahashi and H. Harada, Differential Modulated Pilot Symbol Assisted Adaptive OFDM for Reducint the MLI, Proc. of IEEE TENCON 2004, pp. 577-580, Chiang Mai, Thailand, November, 2004

As disclosed in the [Non-Patent Literature 1], in the Adaptive Modulation Scheme (AMS)/OFDM system, it is necessary to control a modulation level for each sub carrier at base station according to feedback information (FBI; Feedback Information).

The FBI includes evaluation results of channel state information (CSI) such as intensity and noise level of the respective sub carriers, for example.

It is general, here, to assume that accuracy of the FBI is indefinite and transmission of FBI can be ignored. However, in actual application, the transmission of FBI can be a serious problem.

Moreover, if an adaptive-modulated packet is to be transmitted from a base station to a mobile station after the base station controls the modulation level of each sub carrier, the mobile station needs modulation level information (MLI) for demodulation of the received packet.

Since the MLI is generally transmitted as data symbol, throughput of downlink of AMS/OFDM is deteriorated.

In the [Non-Patent Literature 2], such a scheme is proposed that a block of the AMS/OFDM sub carrier is fixed and an encoding rate is made variable for each block.

With this scheme, adjacent sub carriers are made into a block and assigned to the same modulation scheme among various encoding rates. By this arrangement, an amount of MLI transmission is reduced.

However, if the block size becomes large, the throughput is lowered by mismatch between the block modulation level and channel state.

Moreover, the number of required encoders and decoders is increased.

In the [Non-Patent Literature 3][Non-Patent Literature 4], a pilot-symbol-assisted adaptive OFDM system in differential modulation (DMPSA-AMS/OFDM) is proposed so that the MLI transmission amount is reduced.

In the DMPSA-AMS/OFDM system, the MLI is transmitted as a pilot symbol differentially modulated with FEC. Thus, the pilot symbol does not carry any information, and the transmission rate is not lowered.

However, delay time required for differentially demodulating and decoding the received pilot symbol so as to obtain MLI becomes longer.

DISCLOSURE OF THE INVENTION

Problem to be Solved by the Invention

It would be a practical system if the transmission amount of FBI and MLI can be reduced with respect to the AMS/OFDM.

This application has an object to provide a transmission device, receiving device, transmission method, receiving method, a computer-readable information recording medium recording a program that realizes them using a computer, and the program that solves the above problem and improves total throughput of adaptive OFDM communication.

Means for Solving the Problem

In order to achieve the above object, the following invention will be disclosed according to the principle of the present invention.

A transmission device according to a first aspect of the present invention comprises a serial-parallel conversion portion, frequency symbol diffusion portion, pseudo random-number multiplication portion, inverse Fourier transform portion, parallel-serial conversion portion, and transmission portion and configured as follows.

Here, the serial-parallel conversion portion serial-parallel converts a transmission signal to Nc pieces and outputs a plurality of signals, and the i-th symbol in the time direction of the n-th signal in the plurality of signals is:

$$d(n,i).$$

On the other hand, the frequency symbol diffusion portion outputs a plurality of signals using a complex orthogonal diffusion series $c_k(m)$ with the length of Nsf with respect to the outputted plurality of signals $d(n,i)$. Here, $$|c_k(m)|=1$$

and if k=w, it is $$\Sigma_{m=0}^{Nsf-1} c_k(m) \cdot c_w(m)^* = Nsf;$$

if k≠w, $$\Sigma_{m=0}^{Nsf-1} c_k(m) \cdot c_w(m)^* = 0$$

and $(\cdot)^*$ acquires complex conjugation and floor $(\cdot)$ conducts truncation. Among the plurality of signals, the i-th symbol in the time direction of the n-th signal is:

$$u(n,i) = \Sigma_{k=0}^{Nsf-1} c_k(n \bmod Nsf) \cdot d(\text{floor}(n/Nsf) \cdot Nsf+k,i).$$

Moreover, the pseudo random-number multiplication portion multiplies each of the output plurality of signals $u(n,i)$ by $$c_{PN}(n)$$

out of the pseudo random-number code series $$c_{PN}(0), c_{PN}(1), \ldots$$

and outputs the result.

Then, the inverse Fourier transform portion conducts inverse Fourier transform of the outputted plurality of signals $c_{PN}(n) \cdot u(n,i)$ and outputs a plurality of signals.

On the other hand, the parallel-serial conversion portion parallel-serial converts the plurality of signals outputted after the inverse Fourier transform.

Moreover, the transmission portion transmits the signal of the result of parallel-serial conversion.

A receiving device according to another aspect of the present invention communicates with the transmission device and is provided with a receiving portion, serial-parallel conversion portion, Fourier transform portion, pseudo random-number multiplication portion, weight calculation portion, detection portion, frequency equalization combination portion, and parallel-serial conversion portion, which are configured as follows.

Here, the receiving portion receives a signal transmitted from the transmission device.

On the other hand, the serial-parallel conversion portion serial-parallel converts the received signal to Nc pieces and outputs a plurality of signals.

Moreover, the Fourier transform portion conducts Fourier transform of the plurality of serial-parallel converted and outputted signals and outputs a plurality of signals, and the i-th symbol in the time direction of the n-th signal among the plurality of Fourier-transformed and outputted signals is:

$$r(n,i).$$

Then, the pseudo random-number multiplication portion multiplies each of the plurality of Fourier-transformed and outputted signals $r(n,i)$ by complex conjugation $$c_{PN}(n)^*$$

of $$c_{PN}(n)$$

among the pseudo random-number code series and outputs it.

On the other hand, the weight calculation portion calculates a weight to the i-th symbol of the n-th signal:

$$w(n,i).$$

Moreover, the detection portion multiplies the plurality of signals multiplied by the complex conjugation $c_{PN}(n)^*$ and outputted by the calculated weight $w(n,i)$ and outputs a plurality of signals:

$$u^\wedge(n,i) = w(n,i) \cdot c_{PN}(n)^* \cdot r(n,i).$$

Then, the frequency equalization and combination portion performs frequency equalization and combination to the outputted plurality of signals $u(n,i)$ and outputs a plurality of signals, and the i-th symbol in the time direction of the n-th signal in the plurality of signals is:

$$d(n,i) = \Sigma_{k=0}^{Nsf-1} u(\text{floor}(n/Nsf) \cdot Nsf+k,i) \cdot c_{n \bmod Nsf}(k)^*.$$

On the other hand, the parallel-serial conversion portion parallel-serial converts the outputted a plurality of signals $d(n,i)$ and obtains a transmission signal.

Also, the receiving device of the present invention is further provided with a channel transfer function calculation portion, which may be configured as follows.

That is, the channel transfer function calculation portion calculates, using a pilot signal $p(n,i)$ with intensity P, length Np transmitted from the transmission device, a channel transfer function $H(n/Ts)$ by:

$$H(n/Ts) = 1/(Np \cdot (2P/Nc)^{1/2}) \Sigma_{i=0}^{Np-1} r(n,i) \cdot p(n,i)^* \cdot c_{PN} i^*$$

On the other hand, the weight $w(n,i)$ is determined from the channel transfer function $H(n/Ts)$.

Also, at the receiving device of the present invention, it may be so configured that the weight $w(n,i)$ is determined as:

$$w(n,i) = 1/H(n/Ts).$$

Also, at the receiving device of the present invention, by an average $\sigma^2$ of noise intensity evaluated for each of the plurality of signals $r(n,i)$, it may be so configured that the weight $w(n,i)$ is determined as:

$$w(n,i) = (2S/Nc)^{1/2} \cdot H(n/Ts)/(|(2S/Nc)^{1/2} \cdot H(n/Ts)|^2 + 2\sigma^2).$$

A transmission method according to another aspect of the present invention is provided with a serial-parallel conversion process, frequency symbol diffusion process, pseudo random-number multiplication process, inverse Fourier transform process, parallel-serial conversion process, and transmission process, which are configured as follows.

Here, in the serial-parallel conversion process, a transmission signal is serial-parallel converted to Nc pieces and a plurality of signals are outputted, and the i-th symbol in the time direction of the n-th signal in the plurality of signals is:

$$d(n,i).$$

On the other hand, in the frequency symbol diffusion process, a plurality of signals are outputted using a complex orthogonal diffusion series $c_k(m)$ with the length of Nsf with respect to the outputted plurality of signals $d(n,i)$. Here, $$|c_k(m)|=1$$

and if k=w, it is $$\Sigma_{m=0}^{Nsf-1} c_k(m)\cdot c_w(m)^* = Nsf;$$

if $k \neq w$, $$\Sigma_{m=0}^{Nsf-1} c_k(m)\cdot c_w(m)^* = 0$$

and $(\cdot)^*$ acquires complex conjugation and floor $(\cdot)$ conducts truncation. Among the plurality of signals, the i-th symbol in the time direction of the n-th signal is:

$$u(n,i) = \Sigma_{k=0}^{Nsf-1} c_k(n \bmod Nsf)\cdot d(\mathrm{floor}(n/Nsf)\cdot Nsf+k,i).$$

Moreover, in the pseudo random-number multiplication process, each of the outputted plurality of signals u(n,i) is multiplied by $$c_{PN}(n)$$

out of the pseudo random-number code series $$c_{PN}(0), c_{PN}(1), \ldots$$

and outputs the result.

Then, in the inverse Fourier transform process, inverse Fourier transform is conducted for the outputted plurality of signals $c_{PN}(n)\cdot u(n,i)$ and a plurality of signals are outputted.

On the other hand, in the parallel-serial conversion process, the inverse-Fourier-transformed and outputted plurality of signals are parallel-serial converted.

Moreover, in the transmission process, the signal of the result of the parallel-serial conversion is transmitted.

A receiving method according to another aspect of the present invention receives a signal by the transmission method and is provided with a receiving process, serial-parallel conversion process, Fourier transform process, pseudo random-number multiplication process, weight calculation process, detection process, frequency equalization and combination process, and parallel-serial conversion process, which are configured as follows.

Here, in the receiving process, the signal transmitted by the transmission method is received.

On the other hand, in the serial-parallel conversion process, the received signal is serial-parallel converted to Nc pieces and a plurality of signals are outputted.

Moreover, in the Fourier transform process, the plurality of serial-parallel converted and outputted signals are Fourier-transformed and a plurality of signals are outputted, and the i-th symbol in the time direction of the n-th signal among the plurality of Fourier-transformed and outputted signals is:

$$r(n,i).$$

Then, in the pseudo random-number multiplication process, each of the plurality of Fourier-transformed and outputted signals r(n,i) is multiplied by complex conjugation $$c_{PN}(n)^*$$

of $$c_{PN}(n)$$

among the pseudo random-number code series and outputted.

On the other hand, in the weight calculation process, a weight to the i-th symbol of the n-th signal:

$$w(n,i)$$

is calculated.

Moreover, in the detection process, the plurality of signals multiplied by the complex conjugation $c_{PN}(n)^*$ and outputted is multiplied by the calculated weight w(n,i) and a plurality of signals:

$$u\hat{}(n,i) = w(n,i)\cdot c_{PN}(n)^* \cdot r(n,i)$$

are outputted.

Then, in the frequency equalization and combination process, frequency equalization and combination is performed to the outputted plurality of signals u(n,i) and a plurality of signals are outputted, and the i-th symbol in the time direction of the n-th signal in the plurality of signals is:

$$d(n,i) = \Sigma_{k=0}^{Nsf-1} u(\mathrm{floor}(n/Nsf)\cdot Nsf+k,i)\cdot c_{n \bmod Nsf}(k)^*.$$

On the other hand, in the parallel-serial conversion process, the outputted plural signals d(n,i) are parallel-serial converted so as to obtain a transmission signal.

Also, the receiving method of the present invention is further provided with a channel transfer function calculation process, which may be configured as follows.

That is, in the channel transfer function calculation process, using a pilot signal p(n,i) with intensity P, length Np transmitted from the transmission device, a channel transfer function H(n/Ts) is calculated by:

$$H(n/Ts) = 1/(Np\cdot(2P/Nc)^{1/2}) \Sigma_{i=0}^{Np-1} r(n,i)\cdot p(n,i)^* \cdot c_{PN}i^*$$

On the other hand, the weight w(n,i) is determined from the channel transfer function H(n/Ts).

Also, in the receiving method of the present invention, it may be so configured that the weight w(n,i) is determined as:

$$w(n,i) = 1/H(n/Ts).$$

Also, in the receiving method of the present invention, by an average $\sigma^2$ of noise intensity evaluated for each of the plurality of signals r(n,i), it may be so configured that the weight w(n,i) is determined as:

$$w(n,i) = (2S/Nc)^{1/2}\cdot H(n/Ts)/(|(2S/Nc)^{1/2}\cdot H(n/Ts)|^2 + 2\sigma^2).$$

A program according to another aspect of the present invention is characterized in that a computer is configured to function as each portion of the transmission device or each portion of the receiving device.

A computer-readable information recording medium according to another aspect of the present invention is configured to record the above program. The program may be recorded in a computer-readable information storage medium such as compact disk, flexible disk, hard disk, magneto-optical disk, digital video disk, magnetic tape, semiconductor memory and the like.

If the communicating device is configured using a computer or software radio technology using DSP (Digital Signal Processor) and FPGA (Field Programmable Gate Array), for example, the transmission device and receiving device of the present invention is realized by executing the above program, and the program may be distributed/sold to the communicating device via a computer communication network. Also, the information storage medium may be distributed/sold independently of the communicating device.

Effect of the Invention

According to the present invention, the transmission device, receiving device, transmission method, receiving method, computer-readable information recording medium recording the program realizing them using a computer suitable for improvement of performance of adaptive OFDM communication, and the program can be provided.

EXPLANATION OF REFERENCE NUMERALS

Figure 1:
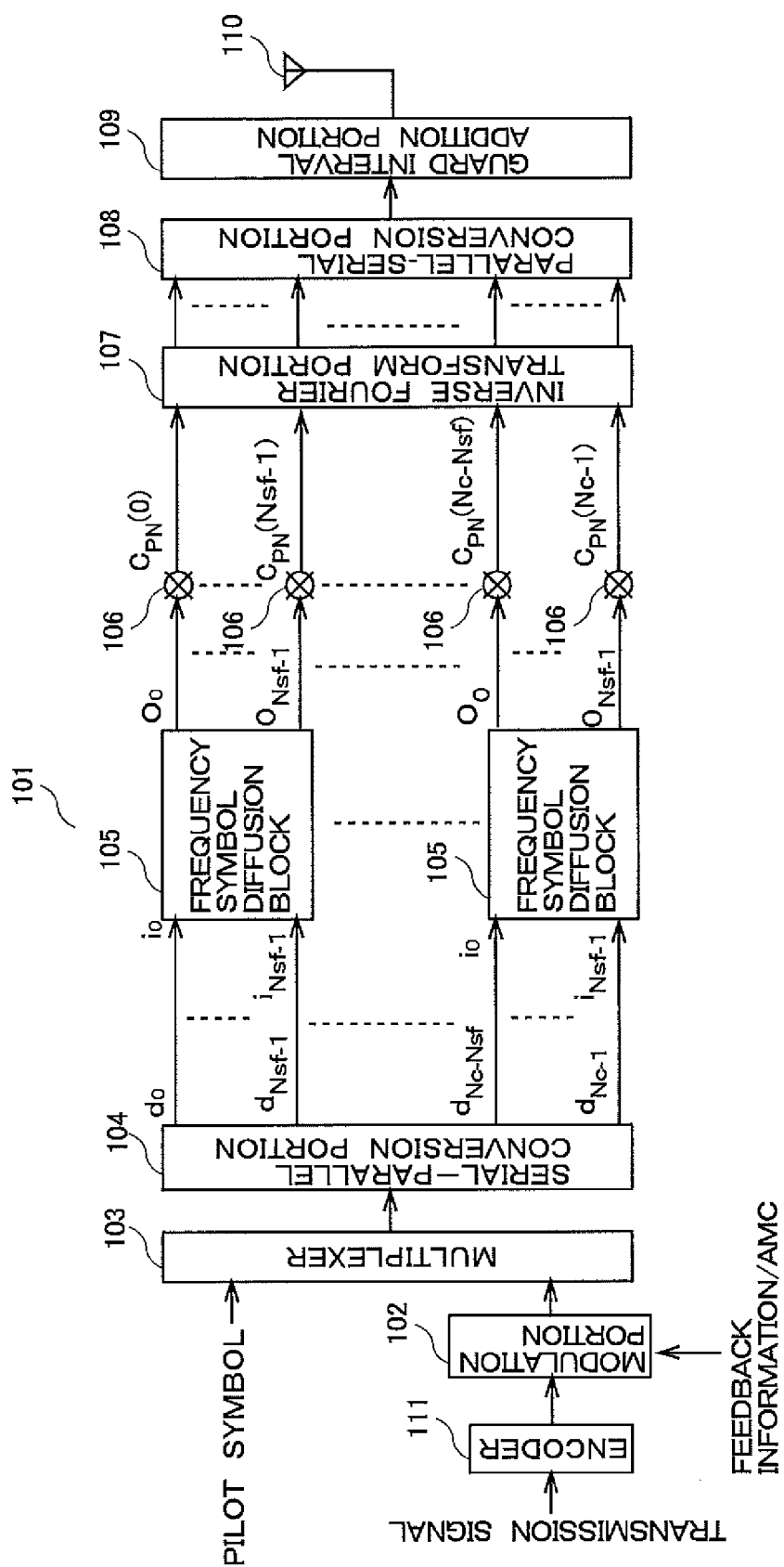
FIG. 1 is an explanatory diagram illustrating a schematic configuration of a transmission device of this embodiment.

101 TRANSMISSION DEVICE
102 MODULATION PORTION
103 MULTIPLEXER
104 SERIAL-PARALLEL CONVERSION PORTION
105 FREQUENCY SYMBOL DIFFUSION BLOCK
106 PSEUDO RANDOM-NUMBER MULTIPLICATION PORTION
107 INVERSE FOURIER TRANSFORM PORTION
108 PARALLEL-SERIAL CONVERSION PORTION
109 GUARD INTERVAL ADDITION PORTION
110 TRANSMISSION PORTION
401 RECEIVING DEVICE
402 RECEIVING PORTION
403 GUARD INTERVAL REMOVAL PORTION
404 SERIAL-PARALLEL CONVERSION PORTION
405 FOURIER TRANSFORM PORTION
406 PSEUDO RANDOM-NUMBER MULTIPLICATION PORTION
407 DETECTION PORTION
408 CHANNEL EVALUATION PORTION
409 PARALLEL-SERIAL CONVERSION PORTION
410 DECODER

BEST MODE FOR CARRYING OUT THE INVENTION

An embodiment of the present invention will be described below. The embodiment described below is for explanation and does not limit the scope of the present invention. Therefore, any embodiment in which each or all the elements are replaced by equivalent elements by those skilled in the art may be employed, and these embodiments are also included in the scope of the present invention.

Example 1

In configuration described below, the frequency symbol diffusion and MMSEC equalization are carried out based on an adaptive downlink OFDM system.

Here, on the transmission side, each of $Nsf=N_{SF}$ pieces of serial-parallel converted signals is diffused by an orthogonal diffusion code with the length of Nsf and then, combined.

By this arrangement, on each sub carrier, a plurality of signals serial-parallel converted with the same intensity rate are superimposed.

In this case, the sub carrier subject to an influence of frequency selective fading is obtained with the same intensity rate for each of the plurality of serial-parallel converted signals.

Therefore, the same modulation level can be assigned to each frequency symbol diffusion block. As a result, a detected signal can be obtained also with the same SINR.

Moreover, since SINR of each sub carrier presents the same value in the same frequency symbol diffusion block, there is only one piece of FBI and MLI unless they are transmitted for each block. This is opposite the conventional AMS/OFDM.

As mentioned above, in the OFDM system described below, a transmission amount of FBI and MLI can be reduced.

However, orthogonality between different diffusion codes might be lost by the frequency selective fading.

Then, in the present application, in order to restore the orthogonality, various frequency equalization technologies are proposed. For example, they include Orthogonal Restoration Combining (ORC) and Minimum Mean Square Error Combining (MMSEC).

Details will be described below.

(Channel Model)

Suppose that a propagation channel consists of L pieces of discrete paths and the respective time delays are different below. Then, an impulse response $h(\tau,t)$ can be represented as in [Formula 1]:

$$h(\tau, t) = \sum_{l=0}^{L-1} h_l(t)\delta(\tau - \tau_l),$$ [Formula 1]

Here, $h_l$ and $\tau_l$ are a complex channel gain and time delay of the first propagation path, respectively. If E|·| is a calculation to acquire an average, the following is true:

$\sum_{l=0}^{L-1} E|h_l^2|=1$

The channel transfer function H(f,t) is Fourier transform of $h(\tau,t)$ and can be obtained as in [Formula 2].

$$H(f, t) = \int_0^\infty h(\tau, t)\exp(-j2\pi f\tau)d\tau$$ [Formula 2]
$$= \sum_{l=0}^{L-1} h_l(t)\exp(-j2\pi f\tau_l).$$

In radio transmission, a channel spectrum response is not flat. In the case of L>1, H(f,t) is not a constant on a signal band width.

Such a channel is called frequency selective fading channel, and this will be considered below with the purpose of evaluating adaptive downlink FSS-OFDM system.

(Transmission Device)

FIG. 1 is an explanatory diagram illustrating schematic configuration of a transmission device according to the adaptive downlink FSS-OFDM/TDMA system of this embodiment. This will be described below referring to the figure.

A transmission device 101 comprises an encoder 111, a modulation portion 102, a multiplexer 103, a serial-parallel conversion portion 104, a frequency symbol diffusion block 105, a pseudo random-number multiplication portion 106, an inverse Fourier transform portion 107, a parallel-serial conversion portion 108, a guard interval addition portion 109, and a transmission portion 110.

Here, a transmission signal is encoded by the encoder 111 and modulated by the modulation portion 102 by a modulation method specified by an adaptive modulation command (AMC; Adaptive Modulation Command) generated based on the feedback information sent from the receiving device. The multiplexer 103 adds Np pieces of pilot symbols to the beginning of the modulated signal string and multiplexes them.

The serial-parallel conversion portion 104 serial-parallel coverts this signal and outputs Nc pieces of parallel signals.

The outputted Nc pieces of parallel signals are grouped (blocked) for Nsf=$N_{SF}$ pieces, and each block is given to the frequency symbol diffusion block 105.

Specifically, the n-th parallel signal is given to the (n−1) mod $N_{SF}$-th sub code processing block of the floor(n/$N_{SF}$)-th frequency symbol diffusion block 105.

Here, Nsf=$N_{SF}$ is a diffusion code length, floor(·) is truncation calculation, and x mod y is calculation to obtain a residue when x is divided by y.

floor(·) can be expressed by noting an expression requiring truncation between the one in which a side is drawn from up to down and a side is further drawn to the right at a right angle and the one in which a side is drawn from up to down and a side is further drawn to the left at a right angle (Gaussian symbol). That is, floor(x) returns the maximum integer not exceeding x.

Figure 2:
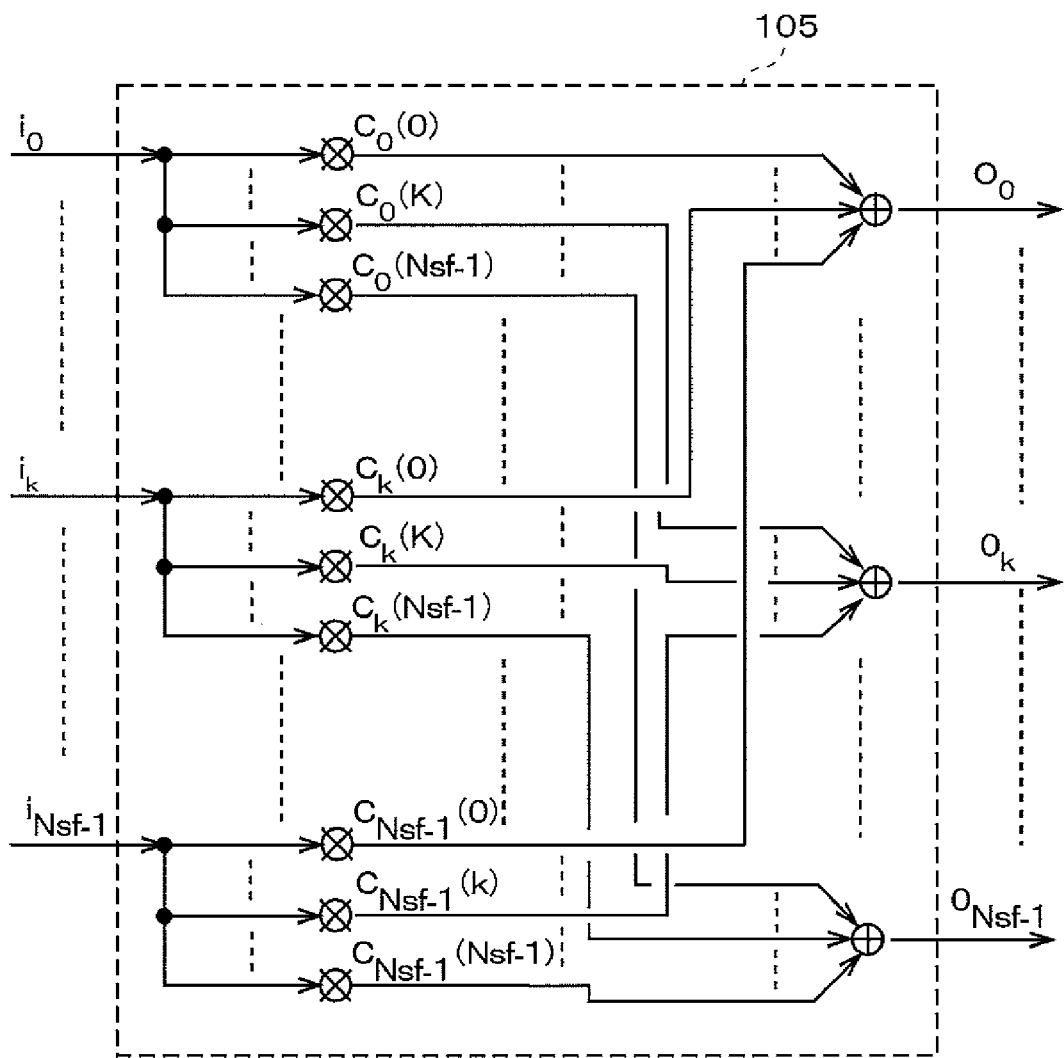
FIG. 2 is an explanatory diagram illustrating a schematic configuration of a frequency symbol diffusion block.

FIG. 2 is an explanatory diagram illustrating schematic configuration of the frequency symbol diffusion block. This will be described below referring to the figure.

When a block of parallel signals is given to the frequency symbol diffusion block 105, the parallel signals are copied in the same number as the length of an orthogonal diffusion code with the length of $N_{SF}$, respectively.

The copied complex string is diffused by $N_{SF}$ pieces of orthogonal diffusion codes, respectively, and combined.

This state will be described below in more detail. As shown in the figure, suppose that $i_0, \ldots, i_k, \ldots, i_{Nsf-1}$ are given as input to each frequency symbol diffusion block 105 and outputs are $o_0 \ldots, o_k, \ldots, o_{Nsf-1}$.

$i_0$ is copied and each is multiplied by $c_0(0), \ldots,$
  $c_0(k), \ldots, c_0(Nsf-1)$ respectively.

...

$i_k$ is copied and each is multiplied by $c_k(0), \ldots,$
  $c_k(k), \ldots, c_k(Nsf-1)$ respectively.

...

$i_{Nsf-1}$ is copied and each is multiplied by $c_{Nsf-1}(0), \ldots, c_{Nsf-1}(k), \ldots, c_{Nsf-1}(Nsf-1)$ respectively.

$i_0 c_o(0) + \ldots + i_k c_k(0) + \ldots + i_{Nsf-1} c_{Nsf1}(0)$ becomes output $o_0$.

...

$i_0 c_o(k) + \ldots + i_k c_k(k) + \ldots + i_{Nsf-1} c_{Nsf1}(k)$ becomes output $o_k$.

...

$i_0 c_o(Nsf-1) + \ldots + i_k c_k(Nsf-1) + \ldots + i_{Nsf-1} c_{Nsf1}(Nsf-1)$ becomes output $o_{Nsf-1}$.

Returning to FIG. 1, this relation will be further examined. If the i-th symbol in the time direction of the n-th parallel signal is $$d(n,i)$$

and $|d(n,i)|=1$, the combined result of the signal u(n,i) can be expressed as in [Formula 3].

$$u(n, i) = \sum_{k=0}^{N_{SF}-1} c_k(n \bmod N_{SF}) \cdot d(\lfloor n/N_{SF} \rfloor \cdot N_{SF} + k, i), \quad \text{[Formula 3]}$$

This can be expressed as:

$$u(n,i) = \Sigma_{k=0}^{Nsf-1} c_k(n \bmod Nsf) \cdot d(\mathrm{floor}(n/Nsf) \cdot Nsf + k, i).$$

Here, $c_k(m)$ is a orthogonal diffusion series, which satisfies:

$$|c_k(m)|=1$$

and also satisfies [Formula 4].

$$\sum_{m=0}^{N_{SF}-1} c_k(m) c_w^*(m) = \begin{cases} N_{SF} & \text{for } k = w \\ 0 & \text{for } k \neq w \end{cases} \quad \text{[Formula 4]}$$

If k=w, this can be written as;

$$\Sigma_{m=0}^{Nsf-1} c_k(m) \cdot c_w(m)^* = Nsf;$$

if k≠w, $$\Sigma_{m=0}^{Nsf-1} c_k(m) \cdot {}^* c_w(m)^* = 0$$

where ·* is calculation to acquire complex conjugation.

To the combined parallel signal obtained as above, the pseudo random-number multiplication portion 106 is diffused in a frequency domain by a long pseudo random-number scramble code:

$$c_{PN}(0), c_{PN}(1), \ldots$$

That is, by multiplying the signal u(n,i) by $c_{PN}(n)$, diffusion is conducted.

After that, the inverse Fourier transform portion 107 carries out inverse fast Fourier transform (IFFT; Inverse Fast Fourier Transform). By this arrangement, the FSS-OFDM/TDMA signal waveform to be transmitted is obtained.

Moreover, the parallel-serial conversion portion 108 conducts parallel-serial conversion, the guard interval addition portion 109 adds guard interval and transmits a signal by the transmission portion 110 made of an antenna.

The downlink FSS-OFDM/TDMA transmission signal can be expressed as [Formula 5] in an equivalent baseband expression:

$$s(t) = \sum_{i=0}^{N_p+N_d-1} g(t-iT) \cdot \left\{ \sqrt{\frac{2S}{N_c}} \sum_{n=0}^{N_c-1} c_{PN}(n) \cdot u(n,i) \cdot \exp[j2\pi(t-iT)n/T_s] \right\}, \quad \text{[Formula 5]}$$

Here, Ts is an effective symbol length, S is an average transmission intensity, and T is an OFDM symbol length. An interval of the adjacent orthogonal sub carrier frequencies is 1/Ts.

A guard interval with a length of Tg is inserted in order to erase inter-carrier interference caused by the frequency selective fading. Therefore, [Formula 6] is true:

$$T = T_s + T_g \quad \text{[Formula 6]}$$

From [Formula 5], [Formula 6], a transmission pulse is obtained as in [Formula 7]:

$$g(t) = \begin{cases} 1 & -T_g \leq t \leq T_s \\ 0 & \text{otherwise} \end{cases} \quad \text{[Formula 7]}$$

Figure 3:
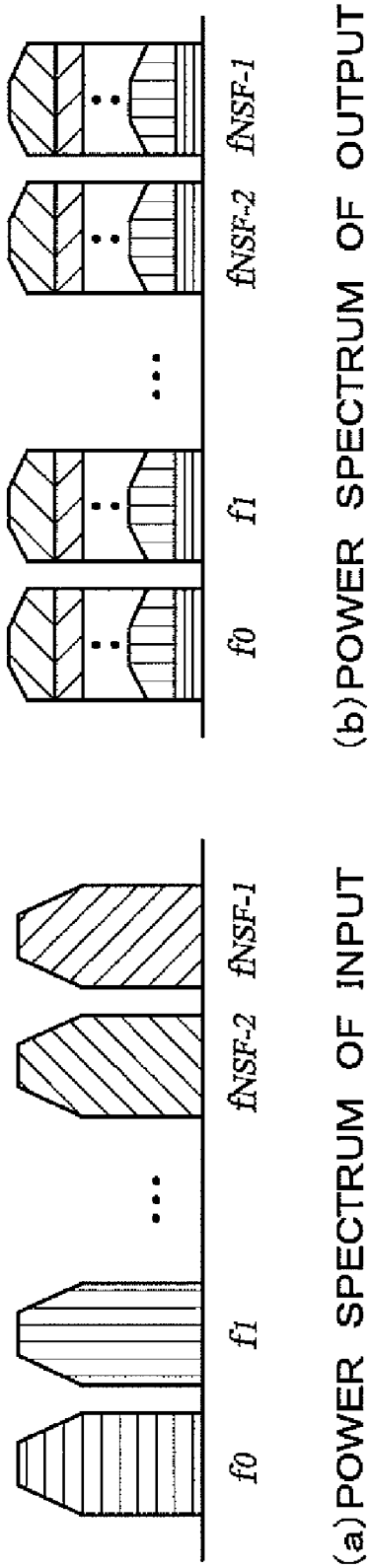
FIG. 3 is an explanatory diagram illustrating intensity spectrums of an input signal and an output signal of the frequency symbol diffusion block.

FIG. 3 are explanatory diagrams illustrating intensity spectrums of an input signal and an output signal of the frequency symbol diffusion block, which will be described below referring to the figures.

FIG. 3A is a power spectrum of the input signal and FIG. 3B is a power spectrum of the output signal.

As mentioned above, the parallel signal d(n,i) is given to the floor(n/Nsf)-th frequency symbol diffusion block 105.

The input data d(n,i) is copied at a magnification of the Nsf times at one frequency symbol diffusion block 105 and multiplied (n mod Nsf) times. At the same frequency symbol diffusion block 105, the output diffusion signals are combined. Therefore, all the data is combined in the frequency domain.

As shown in FIG. 3B, energy of the input data is divided by a diffusion sub code to Nsf pieces of sub carriers, and each sub carrier includes Nsf pieces of divided data.

In this case, the diffusion data is given frequency diversity without changing (increasing) intensity of each sub carrier.

(Receiving Device)

Outline of operation at the receiving device is as follows. That is, when an OFDM waveform is received, it is separated to Nc pieces of orthogonal sub carriers by applying fast Fourier transform (FFT), and the transmitted data is obtained by inverse diffusion of the orthogonal sub carrier received by the orthogonal diffusion code and a scramble code.

In the frequency selective fading, in the case of corruption of the orthogonality between diffusion codes with a possibility of corruption, in order to compensate it, the frequency equalization method such as ORC and MMSEC is used below at detection.

Figure 4:
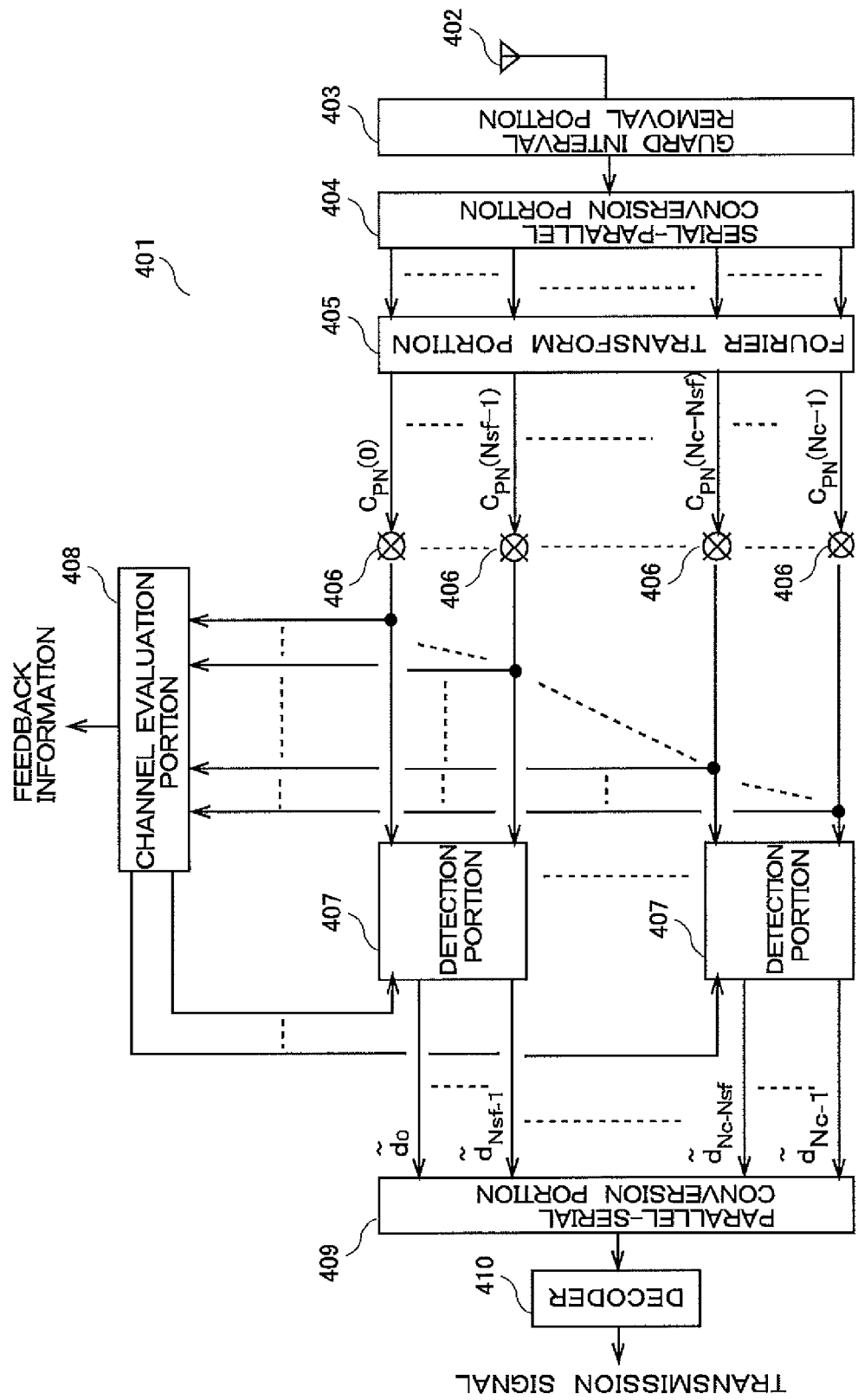
FIG. 4 is an explanatory diagram illustrating a schematic configuration of a receiving device of this embodiment.

Detailed description will be given below. FIG. 4 is an explanatory diagram illustrating schematic configuration of the receiving device according to this embodiment. Description will be made below referring to this figure.

A receiving device 401 is provided with a receiving portion 402, a guard interval removal portion 403, a serial-parallel conversion portion 404, a Fourier transform portion 405, a pseudo random-number multiplication portion 406, a detection portion 407, a channel evaluation portion 408, a parallel-serial conversion portion 409, and a decoder 410.

For a signal r(t) received through the receiving portion 402 made of an antenna, the guard interval removal portion 403 removes guard interval, the serial-parallel conversion portion 404 conducts serial-parallel conversion, and the Fourier transform portion 405 applies fast Fourier transform to it so as to disassemble it to Nc pieces of sub carriers.

The receiving signal is frequency-equalized in order to reduce frequency distortion caused by the frequency selective fading. Since the transmission data symbol is obtained by multiplication of the orthogonal diffusion code on Nc pieces of the sub carriers, the receiving signal r(t) can be expressed as [Formula 8] in equivalent baseband expression:

$$r(t) = \int_{-\infty}^{\infty} h(\tau,t)s(t-\tau)d\tau + n(t) \quad \text{[Formula 8]}$$

Here, n(t) is an additive white Gaussian noise (AWGN: Additive White Gaussian Noise) of a one-side power spectral density $N_0$.

Then, the n-th sub carrier r(n,i) is given as in [Formula 9]:

$$\tilde{r}(n,i) = \frac{1}{T_s}\int_{iT}^{iT+T_s} r(t)\exp[-j2\pi(t-iT)n/T_s]dt \quad \text{[Formula 9]}$$

$$= \sqrt{\frac{2S}{N_c}} \sum_{e=0}^{N_c-1} u(e,i) \cdot \frac{1}{T_s}\int_0^{T_s} \exp[j2\pi(e-n)\cdot t/T_s] \cdot$$

$$\left\{\int_{-\infty}^{\infty} h(\tau, t+iT)g(t-\tau)\cdot\exp(-2\pi e\tau/T_s)d\tau\right\}dt + \hat{n}(n,i)$$

Here, n(n,i) is AWGN with an average 0, variance $2N_0/T_s$.

Here, if the maximum $\tau_l$ is shorter than the guard interval length Tg, integration of $\tau$ is obtained as in [Formula 10] from [Formula 7].

$$\int_{-\infty}^{\infty} h(\tau, t+iT)g(t-\tau)\exp(-j2\pi e\tau/T_s)d\tau = \int_0^{T_s} h(\tau, t+iT) \quad \text{[Formula 10]}$$

$$\exp(-j2\pi e\tau/T_s)d\tau$$

$$= H(e/T_s, t+iT).$$

Here, suppose that $\epsilon_i(t)$ is approximately a constant on the symbol length T. That is, suppose as [Formula 11]:

$$\epsilon_i(t+iT) \approx \epsilon_i(iT) \text{ for } 0 \leq t \leq T \quad \text{[Formula 11]}$$

Then, [Formula 12] is obtained:

$$H(n/T_s, t+iT) \approx H(n/T_s, iT) \text{ for } 0 \leq t \leq T \quad \text{[Formula 12]}$$

As a result, [Formula 9] can be written as [Formula 13]:

$$\tilde{r}(n,i) \approx \frac{1}{T_s}\sqrt{\frac{2S}{N_c}} \sum_{e=0}^{N_c-1} u(e,i) \cdot \quad \text{[Formula 13]}$$

$$\int_0^{T_s} \exp[j2\pi(e-n)\cdot t/T_s] + \hat{n}(n,i)$$

$$= \sqrt{\frac{2S}{N_c}} H(n/T_s, iT)u(n,i) + \hat{n}(n,i)$$

Referring to [Formula 13], it is known that there is frequency distortion in the receiving signal caused by the frequency selective fading. In order to reduce the frequency distortion, frequency equalization and combination is required. Therefore, a weight, which will be described later, is used.

After the fast Fourier transform, $c_{PN}(n)^*$ is multiplied by the pseudo random-number multiplication portion 406 for the n-th sub carrier r(n,i).

Moreover, at the detection portion 407, the frequency equalization and combination shown in [Formula 14] is carried out using the weight w(n,i).

$$\tilde{d}(n,i) = \sum_{k=0}^{N_{SF}-1} \hat{u}(\lfloor n/N_{SF} \rfloor \cdot N_{SF} + k, i)c_{n \bmod N_{SF}}^*(k) \quad \text{[Formula 14]}$$

Here, for k=0, 1, ..., Nsf−1, u^(q+k,i)

is a weighted element of the n-th sub carrier and can be expressed as in [Formula 15]:

$$\hat{u}(n, i) = w(n, i)c_{PN}^*(n)\tilde{r}(n, i) \qquad \text{[Formula 15]}$$

$$= \sqrt{\frac{2S}{N_c}} H(n/T_s, iT)u(n, i)c_{PN}^*(n)w(n, i) +$$

$$\hat{n}(n, i)c_{PN}^*(n)w(n, i)$$

That is, a multiplication result of the pseudo random-number multiplication portion 406 is further multiplied by w(n,i).

d(n,i) obtained as above is so-called decision variable, and the detection portion 407 obtains an original signal (result of encoding) from the decision variable according to the current modulation scheme.

Moreover, the parallel-serial conversion portion 409 conducts parallel-serial conversion and the decoder 410 conducts decoding so as to obtain a transmission signal.

Besides the above, the channel evaluation portion 408 examines what influence the pilot symbol is subject to and sends feedback information obtained by the influence to the transmission device 101 and also gives the evaluation result by the channel evaluation portion 408 to the detection portion 407.

In the above description, detailed description on the details of adaptive modulation and methods of sending FBI, MLI is omitted, but various known arts can be used for that purpose.

However, as mentioned above, according to this embodiment, even if the FBI and MLI are sent by the unit of blocks, drop in performance is small. This point is ascertained by experiments results, which will be described later.

A method of determining the weight w(n,i) by the channel evaluation portion 408 will be further described below.

As shown in [Formula 13], in order to reduce the frequency distortion caused by the frequency selective fading, frequency equalization and combination is required. Here, a method of channel evaluation using Np pieces of pilot signals will be described.

The n-th channel response can be expressed as in [Formula 16]:

$$\tilde{H}(n/T_s) = \frac{1}{N_p\sqrt{2P/N_c}} \sum_{i=0}^{N_p-1} \tilde{r}(n, i) \cdot p^*(n, i) \cdot c_{PN}^*(i) \qquad \text{[Formula 16]}$$

Here, for $0 \leq i \leq N_p$, p(n,i)

is a transmission pilot signal, and P is its intensity. The method of determining the weight will be described below using this channel response H(n/Ts).

(Method by ORC)

In ORC, the combined weight is made in inverse proportion to the channel transfer function H(n/Ts) so as to fully restore the orthogonality. Therefore, the weight $w_{ORC}$(n,i) by the ORC is given by [Formula 17]:

$$\omega_{ORC}(n, i) = \frac{1}{\tilde{H}(n/T_s)} \qquad \text{[Formula 17]}$$

By using this weight, u(n,i) of the n-th sub carrier is obtained as in [Formula 18], [Formula 19]:

$$\hat{u}(n, i) = \omega_{ORC}(n, i)c_{PN}^*(n)\tilde{r}(n, i) \qquad \text{[Formula 18]}$$

$$= \sqrt{\frac{2S}{N_c}} \eta(n, i)u(n, i)c_{PN}^*(n) + \frac{\hat{n}(n, i)c_{PN}^*(n)}{\tilde{H}(n/T_s)}$$

$$\eta(n, i) = \frac{H(n/T_s, iT)}{\tilde{H}(n/T_s)} \qquad \text{[Formula 19]}$$

The decision variable d(n,i) of the i-th data symbol of the n-th sub carrier is obtained as in [Formula 20]:

$$\tilde{d}(n, i) = \sum_{k=0}^{N_{SF}-1} \hat{u}(q+k, i)c_{n \bmod N_{SF}}^*(k) \qquad \text{[Formula 20]}$$

$$= \sum_{k=0}^{N_{SF}-1} \left( \sqrt{\frac{2S}{N_c}} \eta(q+k, i)u(q+k, i)c_{PN}^*(q+k) + \frac{\hat{n}(q+k, i)c_{PN}^*(q+k)}{\tilde{H}((q+k)/T_s)} \right) c_{n \bmod N_{SF}}^*(k)$$

$$= \sqrt{\frac{2S}{N_c}} \sum_{k=0}^{N_{SF}-1} \eta(q+k, i)d(q+k, i) +$$

$$\sqrt{\frac{2S}{N_c}} \sum_{k=0}^{N_{SF}-1} \eta(q+k, i)d_{intr}(q+k, i) \cdot$$

$$c_w(k)c_{n \bmod N_{SF}}^*(k) +$$

$$\sum_{k=0}^{N_{SF}-1} \frac{\hat{n}(q+k, i)c_{PN}^*(k)c_{n \bmod N_{SF}}^*(k)}{\tilde{H}(q+k/T_s)}$$

for $\omega \neq (n \bmod N_{SF})$

Here, q is floor(n/Nsf)·Nsf.

Referring to [Formula 20], it is known that the first term is a desired signal, the second term is an interference term, and the third term is a noise term.

From the third term, it is known that the orthogonality can be restored by the ORC method, but it is also known that if the fading of the sub carrier is deep, the noise term becomes large.

(Method by MMSEC)

The combined weight $w_{MMSEC}$(n,i) in MMSEC is given by [Formula 21]:

$$\omega_{MMSEC}(n, i) = \frac{\sqrt{\frac{2S}{N_c}} \cdot \tilde{H}(n/T_s)}{\left|\sqrt{\frac{2S}{N_c}} \cdot \tilde{H}(n/T_s)\right|^2 + 2\tilde{\sigma}^2} \qquad \text{[Formula 21]}$$

Here, σ is a noise intensity evaluated for each sub carrier, but in this embodiment, the noise intensity $\sigma_n$ in each sub carrier is supposed to be the same for all the sub carriers and to be σ.

Here, the noise intensity $\sigma_n$ of each sub carrier can be acquired by [Formula 22]:

$$\hat{\sigma}_n^2 = \frac{1}{N_p\sqrt{2P/N_c}} \left| \frac{\sum_{i=0}^{N_p-1} \tilde{r}(n,i) -}{\sqrt{2S/N} \cdot \tilde{H}(n/T_s)} \right|^2 \quad \text{[Formula 22]}$$

By supposition, it is $\sigma_n^2 = \sigma^2$, and the noise intensity $\sigma$ can be determined by [Formula 23]:

$$\hat{\sigma}^2 = \frac{1}{N_c}\sum_{n=0} N_c - 1\hat{\sigma}_n^2 \quad \text{[Formula 23]}$$

At this time, the decision variable d(n,i) of the i-th data symbol of the n-th sub carrier can be expressed as in [Formula 24], [Formula 25]:

$$\tilde{d}(n,i) = \sum_{k=0}^{N_{SF}-1} \hat{u}(q+k,i)c^*_{n \bmod N_{SF}}(k) \quad \text{[Formula 24]}$$

$$= \sum_{k=0}^{N_{SF}-1} \left( \sqrt{\frac{2S}{N_c}} \eta(q+k,i)u(q+k,i)c^*_{PN}(q+k) + \frac{\sqrt{\frac{2S}{N_c}} \hat{n}(q+k,i)c^*_{PN}(q+k)\tilde{H}(q+k/T_s)}{\left|\sqrt{\frac{2S}{N_c}} \tilde{H}(q+k/T_s)\right|^2 + 2\hat{\sigma}^2} \right) c^*_{n \bmod N_{SF}}(k)$$

$$= \sqrt{\frac{2S}{N_c}} \sum_{k=0}^{N_{SF}-1} \lambda(q+k,i)d(q+k,i) +$$

$$\sqrt{\frac{2S}{N_c}} \sum_{k=0}^{N_{SF}-1} \lambda(q+k,i)d_{intr}(q+k,i)c_w(k)c^*_{n \bmod N_{SF}}(k) +$$

$$\sum_{k=0}^{N_{SF}-1} \frac{\sqrt{\frac{2S}{N_c}} \hat{n}(q+k,i)\tilde{H}(q+k/T_s)c^*_{PN}(k)c^*_{n \bmod N_{SF}}(k)}{\left|\sqrt{\frac{2S}{N_c}} \tilde{H}(q+k/T_s)\right|^2 + 2\hat{\sigma}^2}$$

for $w \neq (n \bmod N_{SF})$ $$\lambda(n,i) = \frac{H(n/T_s, iT) \cdot \tilde{H}(n/T_s)}{\left|\sqrt{\frac{2S}{N_c}} \tilde{H}(n/T_s)\right|^2 + 2\hat{\sigma}^2} \quad \text{[Formula 25]}$$

Here, it is q=floor(n/Nsf).Nsf.

(FBI and MLI)

Figure 5:
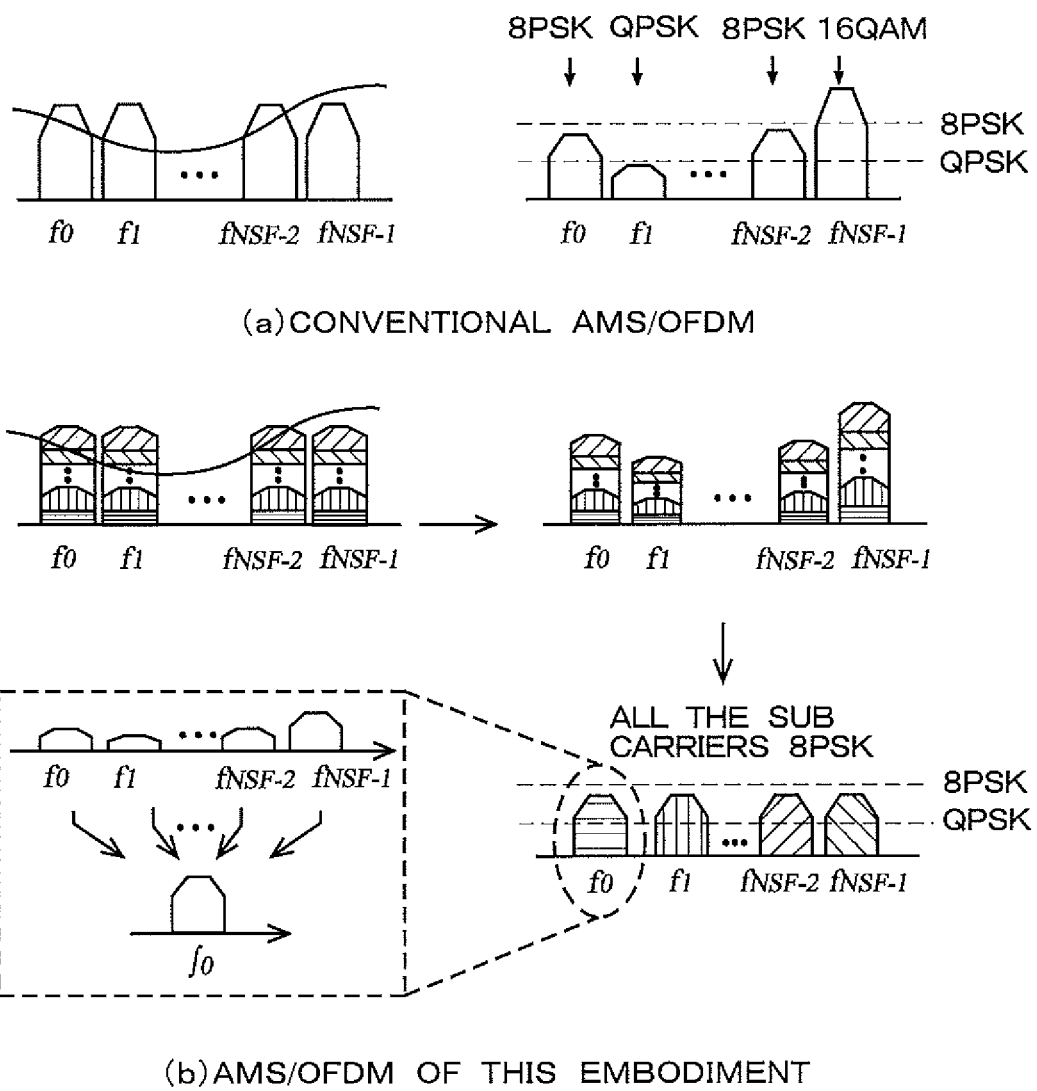
FIG. 5 is an explanatory diagram illustrating a state of intensity of a sub carrier.

FIG. 5 are explanatory diagrams illustrating a state of intensity of a sub carrier. In FIG. 5A, a state in the case of AMS/OFDM by a conventional method is illustrated, while in FIG. 5B, a state in the case of AMS/OFDM by the method of this embodiment is shown. Description will be made below referring to the figures.

Referring to these figures and [Formula 20], [Formula 23], it is known that in the same frequency equalization block, a desired signal, interference and noise/power ratio (SINR) are the same.

In the adaptive OFDM based on the frequency symbol diffusion, each parallel signal is diffused on Nsf pieces of sub carriers by the orthogonal diffusion code with the length Nsf and then, combined.

Therefore, in each sub carrier, parallel signals with the same power rate are superimposed.

In this case, even the sub carrier influenced by the frequency selective fading as well as each parallel signal can obtain the same power rate. Therefore, the SINR of the detection signal becomes the same.

As a result, according to this embodiment, the same modulation level can be assigned to each frequency symbol diffusion block 105.

Moreover, since the SINR of each sub carrier presents the same value in the same frequency symbol diffusion block 105, the number of FBI and MLI required for each frequency symbol diffusion block 105 is 1, which is different from the conventional AMS/OFDM.

Thus, according to this embodiment, the transmission amount of FBI and MLI can be reduced, and performance can be improved.

(Experiment Results)

The experiment results by a numerical simulation will be described below. First, the following specification is used:

Modulation scheme is QPSK, 16QAM.
Demodulation is coherent detection.
Effective data rate is 20M symbols per second.
FFT size is 64.
The number of carriers is 64.
The guard interval length is 16 sample timing.
Frame size is 22 symbols (Np=2, Nd=20).
FEC is convolution code (rate R=½, restricted length K=7).
Fading is 7-path Rayleigh fading.
Doppler frequency is 10 Hz.

First, on the transmission side, data stream is encoded, and the above convolution code is applied. This is known to be efficient for transmitting an OFDM signal on the frequency selective fading channel.

Moreover, using AMC calculated by [Formula 20], [Formula 24], the coded bit is mapped to a modulation symbol of Nc pieces of sub carriers.

The modulation signal is serial-parallel converted, and each parallel signal is diffused by the orthogonal diffusion code with the length Nsf (Walsh-Hadamart code and the like).

By this arrangement, each sub carrier has a plurality of parallel signal superimposed, and their power rates become the same.

An OFDM time signal is generated by inverse Fourier transform, and after cyclic extension is inserted, it is transmitted on a frequency selective/time change radio channel.

Figure 6:
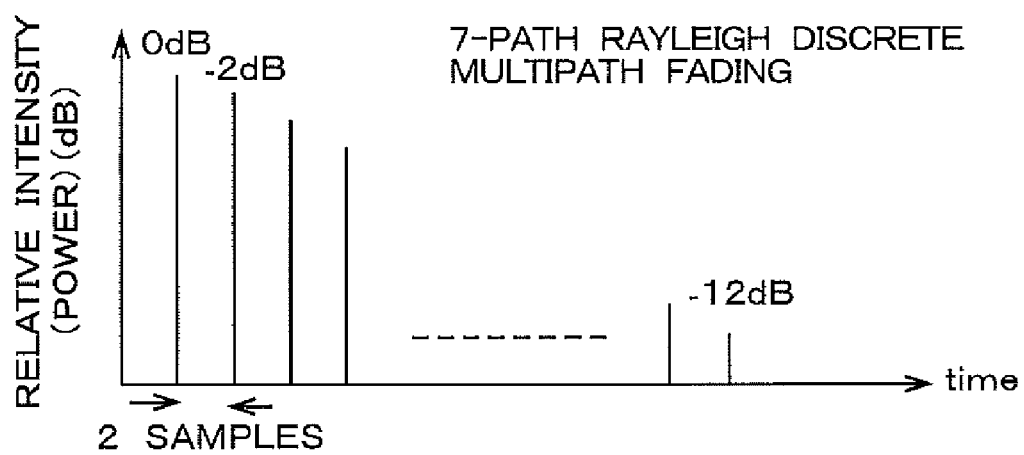
FIG. 6 is an explanatory diagram illustrating a state of transfer channel propagation received by a transmission signal.

FIG. 6 is an explanatory diagram illustrating a state of transmission channel propagation to which the transmission signal is subject. Description will be made below referring to the figure.

A model shown in this figure has a shape in which path Rayleigh fading with L=7 is exponentially attenuated and has a path interval $T_{path=140ns}$.

In this case, the frequency selective fading can be a serious problem.

Suppose that the largest Doppler frequency is 10 Hz.

On the receiving side, the receiving signal is serial-parallel converted, the parallel signal is fast-Fourier-transformed, and the signal is returned to the frequency domain.

Since each signal is diffused by the orthogonal diffusion code on the transmission side, each signal can be detected by the orthogonal diffusion code.

However, the orthogonality between different diffusion codes might be lost by the frequency selective fading.

Then, using the frequency equalization and combination technology, the orthogonality is restored. In this simulation, the ORC method and the MMSEC method are employed as the equalization method.

The signal equalized as above is demodulated by the decision variable obtained according to [Formula 20], [Formula 24].

After the demodulation, binary data is decoded by Viterbi soft-decoding algorithm.

Figure 7:
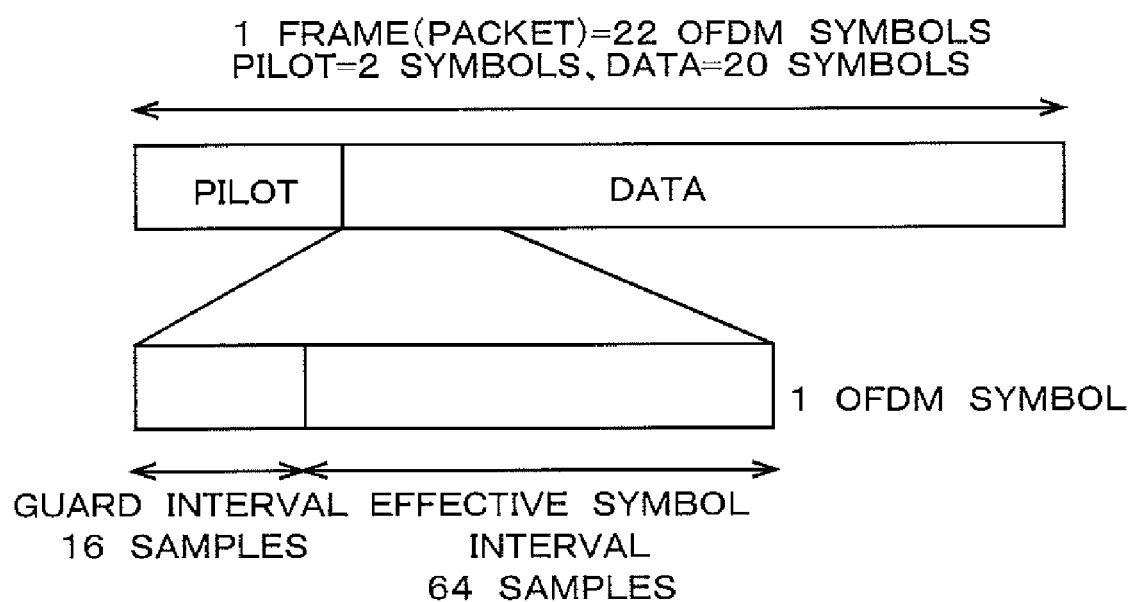
FIG. 7 is an explanatory diagram illustrating a packet structure.

FIG. 7 is an explanatory diagram illustrating a packet structure. Description will be made below referring to this figure.

The packet comprises 64 sub carriers and 22 OFDM symbols. The number of pilot symbols Np is 2, and the number of data Nd is 20. Duration of a single OFDM symbol is 11.2 μs.

Figure 8:
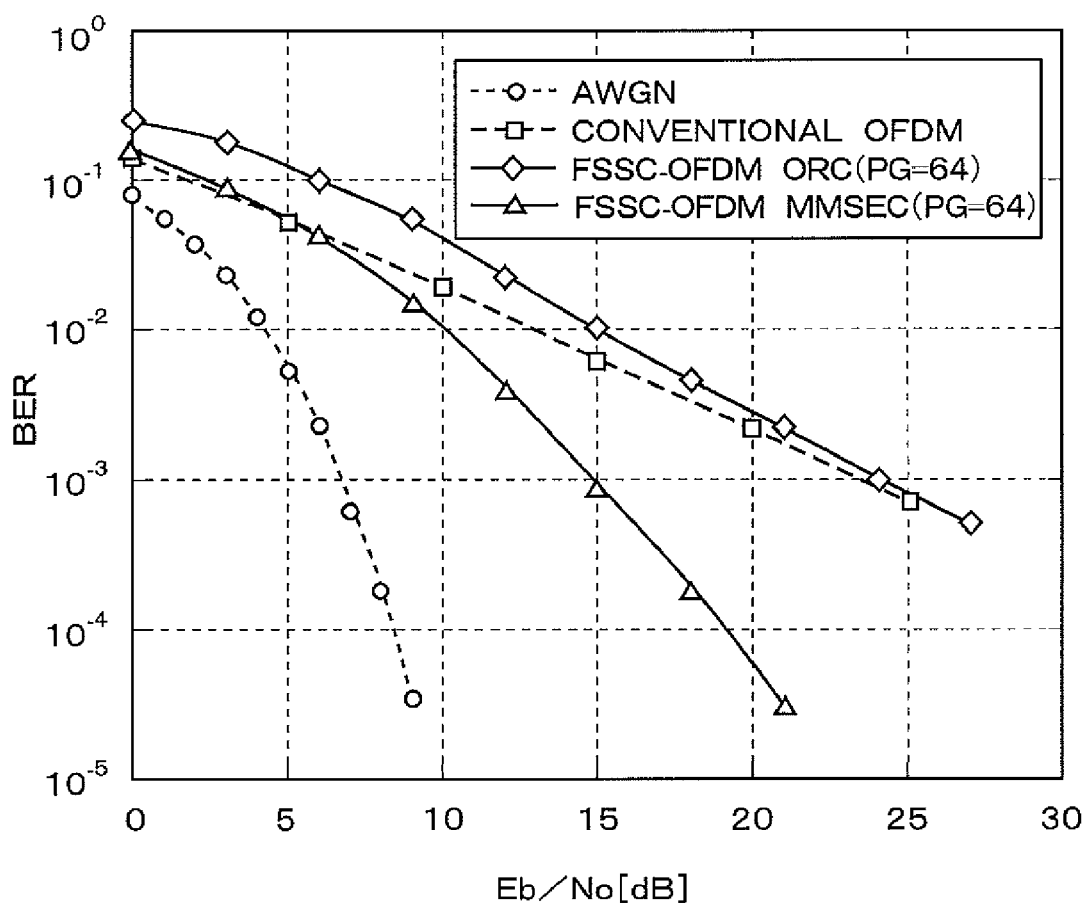
FIG. 8 is a graph illustrating a BER value to the conventional OFDM and a BER value to FSS-OFDM using ORC and MMSEC.

FIG. 8 is a graph illustrating the BER value to the conventional OFDM and the BER value to the FSS-OFDM using ORC and MMSEC. Description will be made below referring to the figure.

The BER of the FFS-OFDM using ORC is poorer than the conventional OFDM at low $E_b/N_0$. That is because a noise is generated even in a state without an error in the ORC-based FFS-OFDM system.

On the other hand, the MMSEC method generates the best BER performance and that is because power loss is minimized while influence of noise is restricted using all the sub carriers.

Figure 9:
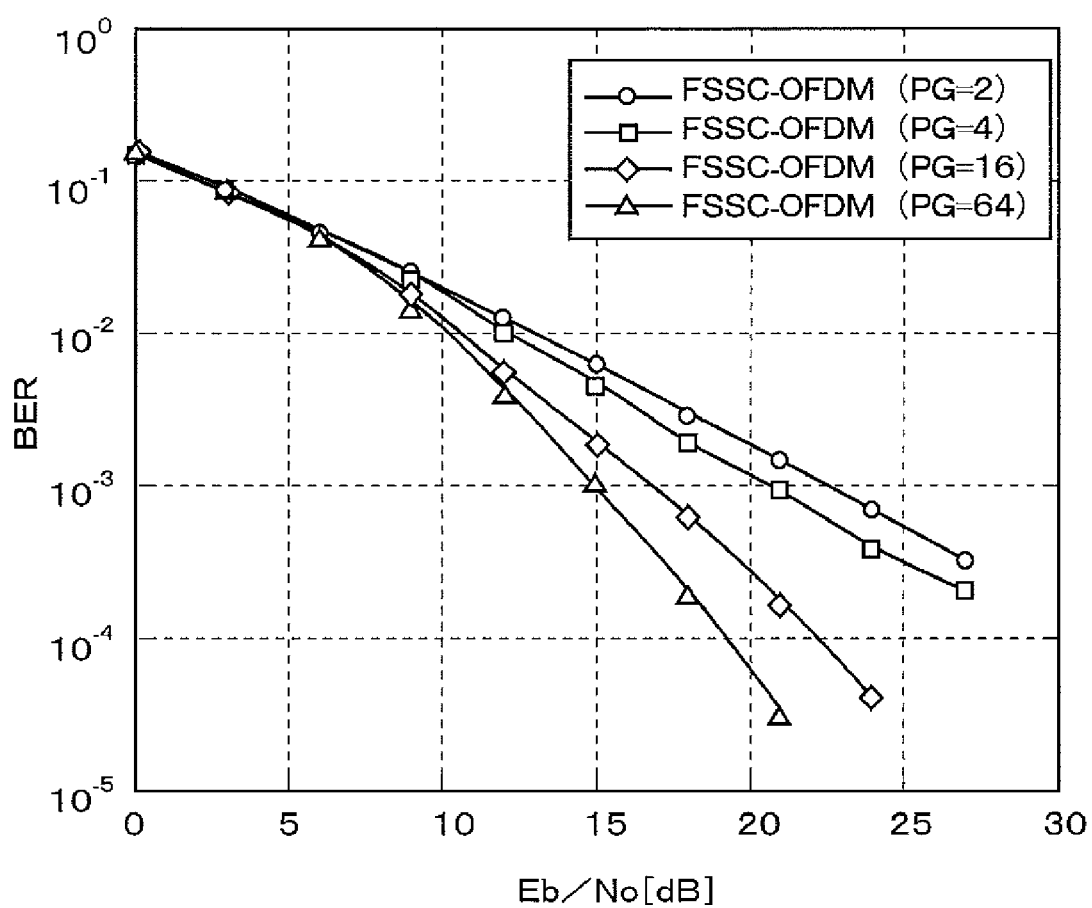
FIG. 9 is a graph illustrating a BER value to the conventional OFDM and a BER value to FSS-OFDM using ORC and MMSEC.

FIG. 9 is a graph showing the BER values of FFS-OFDM when Nsf=2, 4, 16, 64 in MMSEC. Description will be made below referring to this figure.

As shown in this figure, the larger Nsf becomes, the better the BER is improved. That is because frequency diversity is carried out in FFS-OFDM. If Nsf is small, correlation of the subsequent sub carrier becomes stronger, and a degree of the frequency diversity is lowered. In this way, the degree of the frequency diversity can be increased by large Nsf in FFS-OFDM.

However, if Nsf is made too large, a diffusion band width would be wider than the coherent band width.

Figure 10:
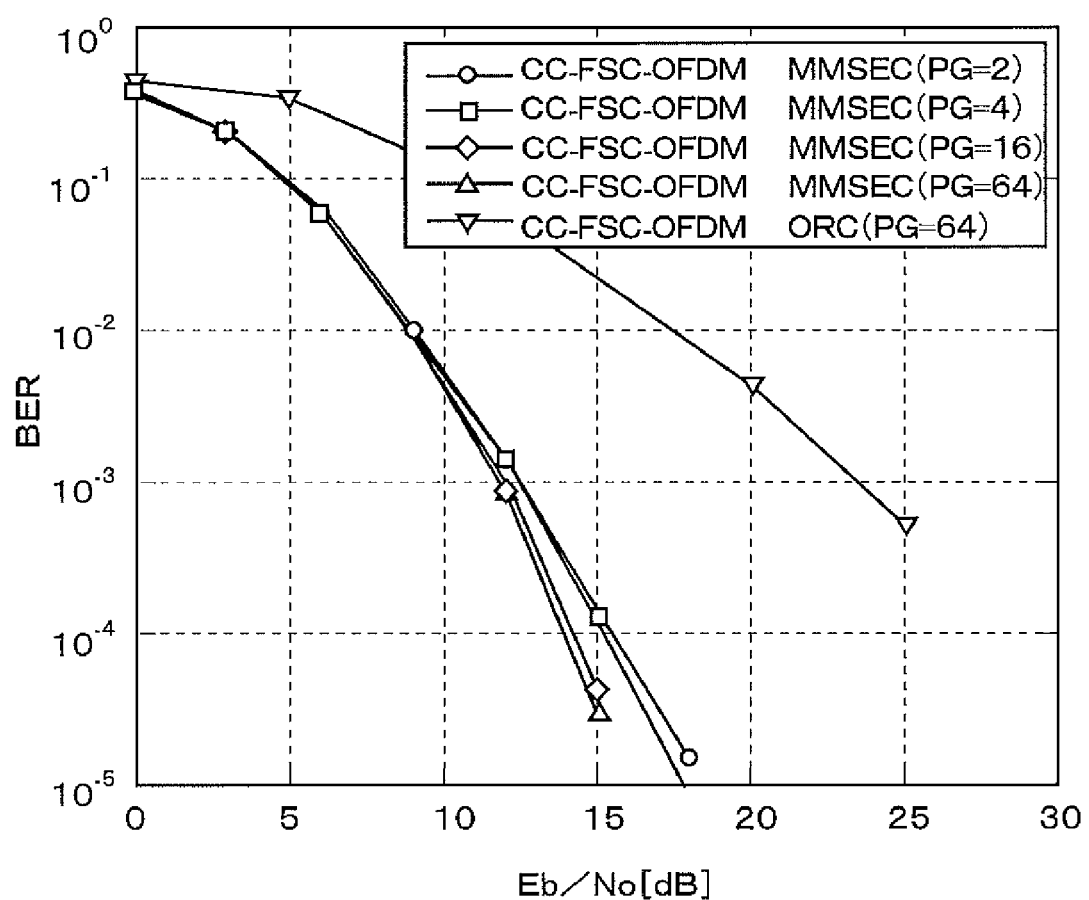
FIG. 10 is a graph illustrating a BER value to the conventional OFDM and a BER value to FSS-OFDM using ORC and MMSEC.

FIG. 10 shows the BER of FFS-OFDM using the convolution code for various Nsf for ORC and MMSEC. Description will be made below referring to this figure.

As shown in this figure, various BER is obtained at different Nsf.

However, by using FEC and interleave, if Nsf is the same, the BER is considered to present approximately the same performance. Therefore, the frequency diversity can be sufficiently conducted by using FEC and interleave.

Figure 11:
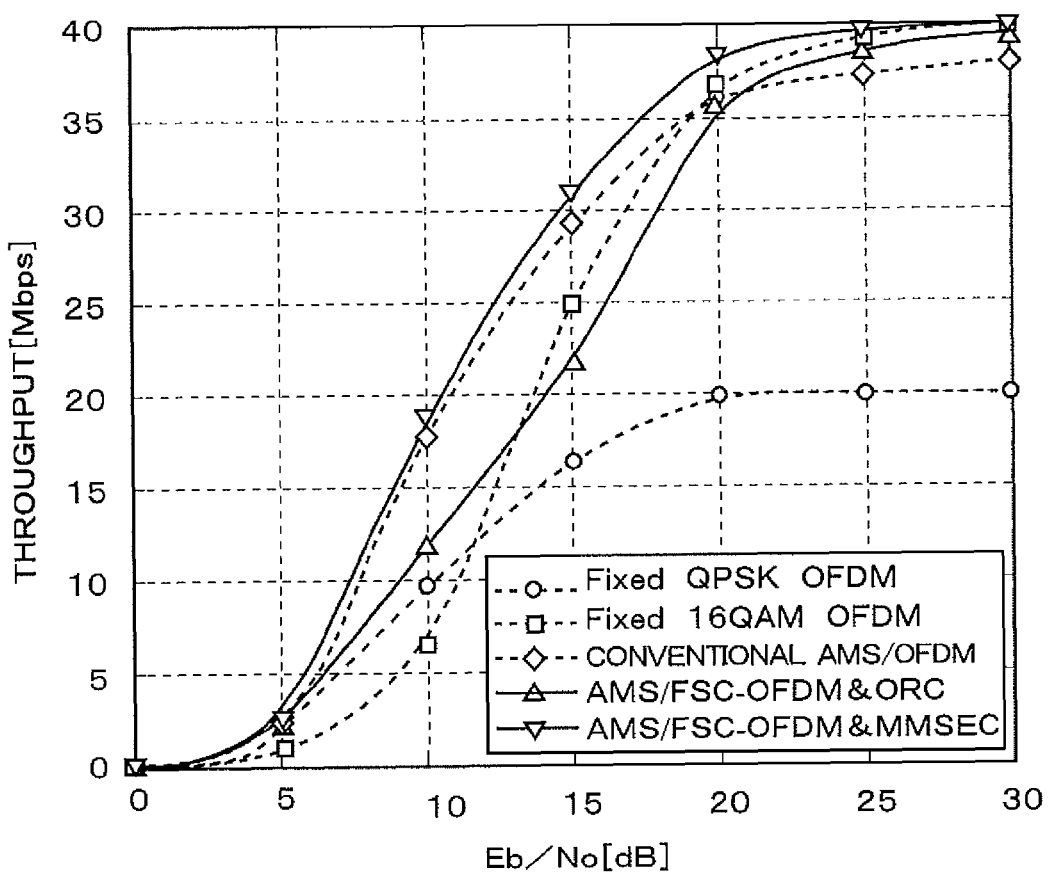
FIG. 11 is a graph illustrating throughputs of fixed QPSK OFDM, fixed 16QAM OFDM, conventional AMS/OFDM, AMS/FSC-OFDM with ORC, AMS/FSC-OFDM with MMSEC.

FIG. 11 is a graph illustrating throughputs of fixed QPSK OFDM, fixed 16QAM OFDM, conventional AMS/OFDM, AMS/FSC-OFDM with ORC, and AMS/FSC-OFDM with MMSEC. Description will be made below referring to the figure.

In the AMS/FSC-OFDM with ORC, AMS/FSC-OFDM with MMSEC according to this embodiment, only one SINR is required as FBI for appropriate modulation, and this is different from fixed QPSK OFDM, fixed 16QAM OFDM, conventional AMS/OFDM according to the conventional method.

Therefore, the system of this embodiment has the best throughput performance.

On the other hand, in the conventional AMS/OFDM system, MLI is transmitted as data, and the transmission rate is lower than that of the system of this embodiment.

Figure 12:
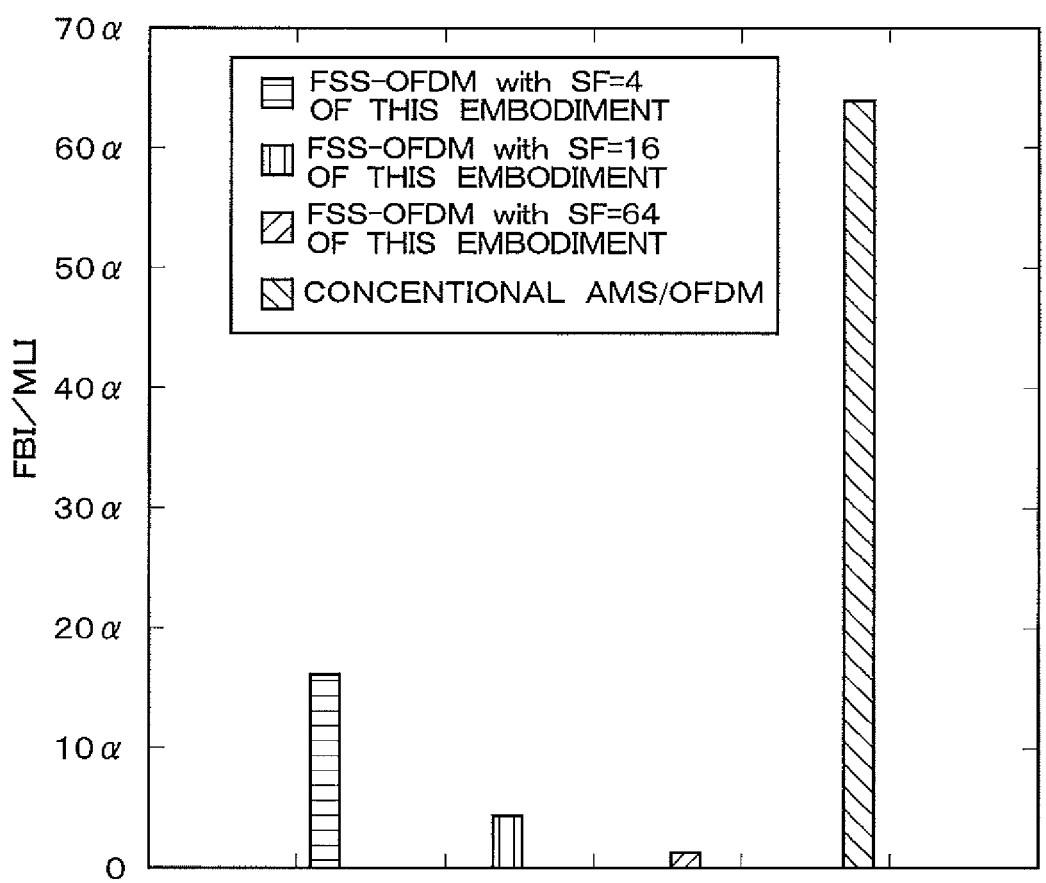
FIG. 12 is a graph illustrating throughputs of fixed QPSK OFDM, fixed 16QAM OFDM, conventional AMS/OFDM, AMS/FSC-OFDM with ORC, AMS/FSC-OFDM with MMSEC.

FIG. 12 is a graph illustrating the transmission amounts of FBI and MLI of the conventional AMS/OFDM and AMS/FSS-OFDM of this embodiment for Nsf=4, 16, 64. Description will be made below referring to the figure.

As shown in this figure, when the transmission amounts of FBI and MLI at Nsf=64 in AMS/FSS-OFDM of this embodiment is α, the transmission amount at Nsf=16 in AMS/FSS-OFDM of this embodiment is 4α, the transmission amount at Nsf=4 in AMS/FSS-OFDM of this embodiment is 16α, and the transmission amount of the conventional AMS/OFDM is approximately 64α.

Therefore, the transmission amount α of FBI and MLI of AMS/FSS-OFDM of this embodiment is considerably small.

INDUSTRIAL APPLICABILITY

As mentioned above, according to the present invention, the transmission device, receiving device, transmission method, receiving method, computer-readable information recording medium recording a program for realizing them using a computer, and the program, which are suitable for realizing improvement of performance of adaptive OFDM, can be provided.

The invention claimed is:

1. A transmission device comprising:
a serial-parallel conversion portion that serial-parallel converts a transmission signal to a plurality of signals corresponding to Nc number of subcarriers and outputs the plurality of signals, the i-th symbol in the time direction of the n-th signal in the plurality of signals being:

$d(n,i)$;

a frequency symbol diffusion portion that outputs a plurality of signals with substantially the same transmitting electrical power with respect to the output plurality of signals d(n,i) for each signal group, in which each Nsf signals in order of n of the plurality of signals d(n,i) is grouped, using a plurality of complex orthogonal diffusion series $c_0(0), c_0(1), \ldots, c_0(Nsf-1)$, $c_1(0), c_1(1), \ldots, c_1(Nsf-1)$, $\ldots$ $c_{Nsf-1}(0), c_{Nsf-1}(0), \ldots, c_{Nsf-1}(Nsf-1)$, with a length of Nsf with respect to said outputted plurality of signals d(n,i), wherein $|c_k(m)|=1$ and if k=w, $\sum_{m=0}^{Nsf-1} c_k(m) \cdot c_w(m)^* = Nsf$;

if k≠w, $\sum_{m=0}^{Nsf-1} c_k(m) \cdot c_w(m)^* = 0$ and an expression (·)* acquires complex conjugation and floor (·) conducts truncation, among the plurality of signals, the i-th symbol in the time direction of the n-th signal is:

$u(n,i) = \sum_{k=0}^{Nsf-1} c_k(n \bmod Nsf) \cdot d(\text{floor}(n/Nsf) \cdot Nsf + k, i)$;

a pseudo random-number multiplication portion that multiplies each of said outputted plurality of signals u(n,i) by a pseudo random-number code series $c_{PN}(n)$ out of the pseudo random-number code series $c_{PN}(0), c_{PN}(1), \ldots$ and outputs the result;

an inverse Fourier transform portion that conducts inverse Fourier transform of said outputted plurality of signals $$c_{PN}(n) \cdot u(n,i)$$

and outputs a plurality of signals;
a parallel-serial conversion portion that parallel-serial converts said plurality of signals outputted after the inverse Fourier transform; and
a transmission portion that transmits the signal of the result of said parallel-serial converted signal; and
an adaptive modulating portion that adaptive modulates the transmission signal on the basis of feedback information for each signal group transmitted from a receiving device.

2. A receiving device communicating with the transmission device according to claim 1, the receiving device comprising:
a receiving portion that receives a signal transmitted from said transmission device;
a serial-parallel conversion portion that serial-parallel converts said received signal to Nc number of groups and outputs a plurality of signals;
a Fourier transform portion that conducts Fourier transform of said plurality of serial-parallel converted and outputted signals and outputs a plurality of signals, wherein the i-th symbol in the time direction of the n-th signal among said plurality of Fourier-transformed and outputted signals is:

$$r(n,i);$$

a pseudo random-number multiplication portion that multiplies each of said plurality of Fourier-transformed and outputted signals r(n,i) by complex conjugation $$c_{PN}(n)^*$$

of $$c_{PN}(n)$$

among the pseudo random-number code series and outputs it;
a weight calculation portion that calculates a weight to the i-th symbol of the n-th signal:

$$w(n,i);$$

a detection portion that multiplies the plurality of signals multiplied by the complex conjugation $c_{PN}(n)^*$ and outputted by said calculated weight w(n,i) and outputs a plurality of signals:

$$u^\hat{}(n,i) = w(n,i) \cdot c_{PN}(n)^* \cdot r(n,i);$$

a frequency equalization and combination portion that performs frequency equalization and combination to said outputted plurality of signals u(n,i) and outputs a plurality of signals, wherein the i-th symbol in the time direction of the n-th signal in the plurality of signals is:

$$d(n,i) = \Sigma_{k=0}^{Nsf-1} u(\text{floor}(n/Nsf) \cdot Nsf + k, i) \cdot c_{n \bmod Nsf}(k)^*;$$
and a parallel-serial conversion portion that parallel-serial converts said outputted plural signals d(n,i) and obtains a transmission signal:
a channel evaluating portion for creating feedback information for each signal group, in which each set of Nsf signals in the order of n of the plurality of signals d(n,i) outputted is grouped, and for transmitting the feedback information to the transmitting device.

3. The receiving device according to claim 2, further comprising
a channel transfer function calculation portion that calculates, using a pilot signal p(n,i) with intensity P, length Np and the effective symbol length Ts transmitted from said transmission device, a channel transfer function H(n/Ts) by:

$$H(n/Ts) = 1/(Np \cdot (2P/Nc)^{1/2}) \Sigma_{i=0}^{Np-1} r(n,i) \cdot p(n,i)^* \cdot c_{PN}(i)^*, \text{wherein}$$

the weight w(n,i) is determined from the channel transfer function H(n/Ts).

4. The receiving device according to claim 3, wherein the weight w(n,i) is determined as:

$$w(n,i) = 1/H(n/Ts).$$

5. The receiving device according to claim 3, wherein by an average $\sigma^2$ of noise intensity evaluated for each of the plurality of signals r(n,i), the weight w(n,i) is determined, with respective to an average transmitting electrical power S, as:

$$w(n,i) = (2S/Nc)^{1/2} \cdot H(n/Ts)/(|(2S/Nc)^{1/2} \cdot H(n/Ts)|^2 + 2\sigma^2).$$

6. A transmission method comprising steps of:
serial-parallel conversion of serial-parallel converting a transmission signal to a plurality to signals corresponding to Nc number of subcarriers and outputting the plurality of signals, wherein the i-th symbol in the time direction of the n-th signal in the plurality of signals is:

$$d(n,i);$$

a frequency symbol diffusion that outputs a plurality of signals with substantially the same transmitting electrical power with respect to the output plurality of signals d(n,i) for each signal group, in which each Nsf signals in order of n of the plurality of signals d(n,i) is grouped, using a plurality of complex orthogonal diffusion series $$c_0(0), c_0(1), \ldots, c_0(Nsf-1),$$

$$c_1(0), c_1(1), \ldots, c_1(Nsf-1),$$

$$\ldots$$

$$c_{Nsf-1}(0), c_{Nsf-1}(1), \ldots, c_{Nsf-1}(Nsf-1),$$

with the length of Nsf with respect to said outputted plurality of signals d(n,i), wherein $$|c_k(m)| = 1$$

and if k=w, $$\Sigma_{m=0}^{Nsf-1} c_k(m) \cdot c_w(m)^* = Nsf;$$

if k≠w, $$\Sigma_{m=0}^{Nsf-1} c_k(m) \cdot c_w(m)^* = 0$$

and an expression $(\cdot)^*$ acquires complex conjugation and floor $(\cdot)$ conducts truncation, among the plurality of signals, the i-th symbol in the time direction of the n-th signal is:

$$u^\hat{}(n,i) \Sigma_{k=0}^{Nsf-1} c_k(n \bmod Nsf) \cdot d(\text{floor}(n/Nsf) \cdot Nsf + k, i);$$

pseudo random-number multiplication of multiplying each of said outputted plurality of signals u(n,i) by the pseudo random-number code series $$c_{PN}(n)$$

out of the pseudo random-number code series $$c_{PN}(0), c_{PN}(1), \ldots$$

and outputting the result;
conducting inverse Fourier transform of said outputted plurality of signals $c_{PN}(n) \cdot u(n,i)$ and outputting a plurality of signals;
parallel-serial converting said inverse-Fourier-transformed and outputted plurality of signals;
transmitting the signal of the result of said parallel-serial conversion; and
adaptive modulating for adaptive modulating the transmission signal on the basis of feedback information for each signal group.

7. A receiving method for receiving a signal by the transmission method according to claim 6, comprising steps of:
receiving a signal transmitted by said transmission method;
serial-parallel converting said received signal to Nc number of groups and outputting a plurality of signals;
conducting Fourier transform of said plurality of serial-parallel converted and outputted signals and outputting a plurality of signals, wherein the i-th symbol in the time direction of the n-th signal among said plurality of Fourier-transformed and outputted signals is:

$r(n,i)$ pseudo random-number multiplication of multiplying each of said plurality of Fourier-transformed and outputted signals $r(n,i)$ by complex conjugation $c_{PN}(n)^*$ of $c_{PN}(n)^*$ among the pseudo random-number code series and outputting it;
calculating a weight to the i-th symbol of the n-th signal:

$w(n,i)$;

detection in which the plurality of signals multiplied by the complex conjugation $c_{PN}(n)^*$ and outputted by are multiplied by said calculated weight $w(n,i)$ and a plurality of signals are outputted:

$u(n,i)=w(n,i) \cdot c_{PN}(n)^* \cdot r(n,i)$ frequency equalization and combination in which frequency equalization and combination is performed to said outputted plurality of signals $u(n,i)$ and a plurality of signals are outputted, wherein the i-th symbol in the time direction of the n-th signal in the plurality of signals is:

$d(n,i)=\Sigma_{k=0}^{Nsf-1} u(\text{floor}(n/Nsf) \cdot Nsf+k,i) \cdot c_{n \bmod Nsf}(k)^*$;
and parallel-serial conversion of parallel-serial converting said outputted plural signals $d(n,i)$ so as to obtain a transmission signal; and
a channel evaluating for creating feedback information for each signal group, in which each set of Nsf signals in the of n of the plurality of signals $d(n,i)$ outputted is grouped, and for transmitting the feedback information.

8. The receiving method according to claim 7, further comprising a step of
channel transfer function calculation, using a pilot signal $p(n,i)$ with intensity P, length Np and an effective symbol length Ts transmitted by said transmission method, the channel transfer function $H(n/Ts)$ being calculated by:

$H(n/Ts)=1/(Np \cdot (2P/Nc)^{1/2}) \Sigma_{i=0}^{Np-1} r(n,i) \cdot p(n,i)^* \cdot c_{PN}(i)^*$, wherein the weight $w(n,i)$ is determined from the channel transfer function $H(n/Ts)$.

9. The receiving method according to claim 8, wherein the weight $w(n,i)$ is determined as:

$w(n,i)=1/H(n/Ts)$.

10. The receiving method according to claim 8, wherein
by an average $\sigma^2$ of noise intensity evaluated for each of the plurality of signals $r(n,i)$, the weight $w(n,i)$ is determined, with respective to an average transmitting electrical power S, as:

$w(n,i)=(2S/Nc)^{1/2} \cdot H(n/Ts)/(|(2S/Nc)^{1/2} \cdot H(n/Ts)|^2+2\sigma^2)$.

* * * * *